(12) United States Patent
Yoshitake et al.

(10) Patent No.: US 12,491,934 B2
(45) Date of Patent: Dec. 9, 2025

(54) STEERING DEVICE

(71) Applicant: KNORR-BREMSE COMMERCIAL VEHICLE SYSTEMS JAPAN LTD., Sakado (JP)

(72) Inventors: Atsushi Yoshitake, Higashimatsuyama (JP); Shigeru Mochizuki, Saitama (JP)

(73) Assignee: KNORR-BREMSE COMMERCIAL VEHICLE SYSTEMS JAPAN LTD., Sakado (JP)

( * ) Notice: Subject to any disclaimer, the term of this patent is extended or adjusted under 35 U.S.C. 154(b) by 44 days.

(21) Appl. No.: 18/294,605

(22) PCT Filed: Jun. 16, 2022

(86) PCT No.: PCT/JP2022/024113
§ 371 (c)(1),
(2) Date: Feb. 2, 2024

(87) PCT Pub. No.: WO2023/013258
PCT Pub. Date: Feb. 9, 2023

(65) Prior Publication Data
US 2024/0343299 A1 Oct. 17, 2024

(30) Foreign Application Priority Data
Aug. 4, 2021 (JP) .................................. 2021-128260

(51) Int. Cl.
*B62D 5/32* (2006.01)
*B62D 5/04* (2006.01)
(Continued)

(52) U.S. Cl.
CPC ................. *B62D 5/32* (2013.01); *B62D 5/04* (2013.01); *B62D 5/046* (2013.01); *B62D 5/06* (2013.01);
(Continued)

(58) Field of Classification Search
CPC . B62D 5/04; B62D 5/046; B62D 5/06; B62D 5/065; B62D 5/083; B62D 5/12; B62D 5/32; B62D 6/00
See application file for complete search history.

(56) References Cited

U.S. PATENT DOCUMENTS

2018/0022381 A1* 1/2018 Matsumura .............. B62D 6/00
180/419
2018/0339727 A1* 11/2018 Ueyama ................. B62D 5/065
(Continued)

FOREIGN PATENT DOCUMENTS

JP  2018158623 A  * 10/2018
JP  2019209739 A  * 12/2019
(Continued)

OTHER PUBLICATIONS

International Preliminary Report on Patentability for PCT Appl. Ser. No. PCT/JP2022/024113 mail date Feb. 15, 2024 (10 pages).
(Continued)

*Primary Examiner* — John M Zaleskas
(74) *Attorney, Agent, or Firm* — Foley & Lardner LLP

(57) ABSTRACT

A steering device includes a control unit that includes a hydraulic abnormality determiner. The hydraulic abnormality determiner is configured to determine a hydraulic abnormality to be present in a pair of liquid chambers of a power cylinder of the steering device, in response to satisfaction of a condition that a total torque of a steering torque measured by a torque sensor and a motor assist torque provided by an electric motor is greater than a predetermined threshold torque. The control unit is configured to increase the motor assist torque in response to satisfaction of a condition that the hydraulic abnormality determiner determines the hydraulic abnormality to be present.

6 Claims, 8 Drawing Sheets

(51) Int. Cl.
  *B62D 5/06* (2006.01)
  *B62D 5/065* (2006.01)
  *B62D 5/083* (2006.01)
  *B62D 5/12* (2006.01)
  *B62D 6/00* (2006.01)

(52) U.S. Cl.
  CPC ............ *B62D 5/064* (2013.01); *B62D 5/065* (2013.01); *B62D 5/083* (2013.01); *B62D 5/12* (2013.01); *B62D 6/00* (2013.01)

(56) References Cited

U.S. PATENT DOCUMENTS

| | | | |
|---|---|---|---|
| 2019/0111965 A1* | 4/2019 | Matsumura | B62D 5/12 |
| 2019/0168802 A1* | 6/2019 | Matsumura | B62D 5/0463 |
| 2020/0324806 A1* | 10/2020 | Aoki | B62D 5/063 |
| 2021/0024126 A1* | 1/2021 | Matsumura | B62D 5/12 |
| 2022/0126912 A1* | 4/2022 | Uchida | B62D 5/30 |

FOREIGN PATENT DOCUMENTS

| | | |
|---|---|---|
| JP | 2020-011585 A | 1/2020 |
| WO | WO-2020/122783 A1 | 6/2020 |
| WO | WO-2020/170579 A1 | 8/2020 |

OTHER PUBLICATIONS

International Search Report for PCT Appl. Ser. No. PCT/JP2022/024113 dated Sep. 6, 2022 (2 pages).

\* cited by examiner

STEERING DEVICE

TECHNICAL FIELD

The present invention relates to a steering device.

BACKGROUND ART

Patent Document 1 cited below discloses a steering device.

The steering device in Patent Document 1 includes: a piston; a pair of liquid chambers defined by the piston; a power cylinder structured to provide hydraulic assist torque for steering turning wheels; a rotary valve structured to supply hydraulic liquid to the pair of liquid chambers selectively depending on rotation of a steering shaft; and an electric motor structured to provide motor assist torque for the steering shaft. Furthermore, the steering device includes a controller controlling the electric motor and including an abnormality determination section that determines presence or absence of a hydraulic abnormality in the hydraulic chambers, based on a steering torque.

The steering device in Patent Document 1 determines presence or absence of the hydraulic abnormality in the hydraulic chambers depending on the steering torque, and therefore may fail in the determination of the hydraulic abnormality in the hydraulic chambers during automatic driving during which the steering torque is zero.

In view of the foregoing conventional circumstances, it is desirable to provide a steering device configured to determine presence or absence of a hydraulic abnormality in liquid chambers during both automatic driving and manual driving.

PRIOR ART DOCUMENT(S)

Patent Document(s)

Patent Document 1: JP 2020-011585 A

SUMMARY OF THE INVENTION

According to one aspect of the present invention, a control unit includes a hydraulic abnormality determiner. The hydraulic abnormality determiner is configured to determine a hydraulic abnormality to be present in a pair of liquid chambers, in response to satisfaction of a condition that a total torque of a steering torque and a motor assist torque is greater than a predetermined threshold torque. The control unit is configured to increase the motor assist torque of an electric motor in response to satisfaction of a condition that the hydraulic abnormality determiner determines the hydraulic abnormality to be present.

The above aspect of the present invention serves to determine presence or absence of the hydraulic abnormality in the liquid chambers during both automatic driving and manual driving.

MODE(S) FOR CARRYING OUT THE INVENTION

The following describes embodiments of a steering device according to the present invention, with reference to the drawings.

Figure 1:
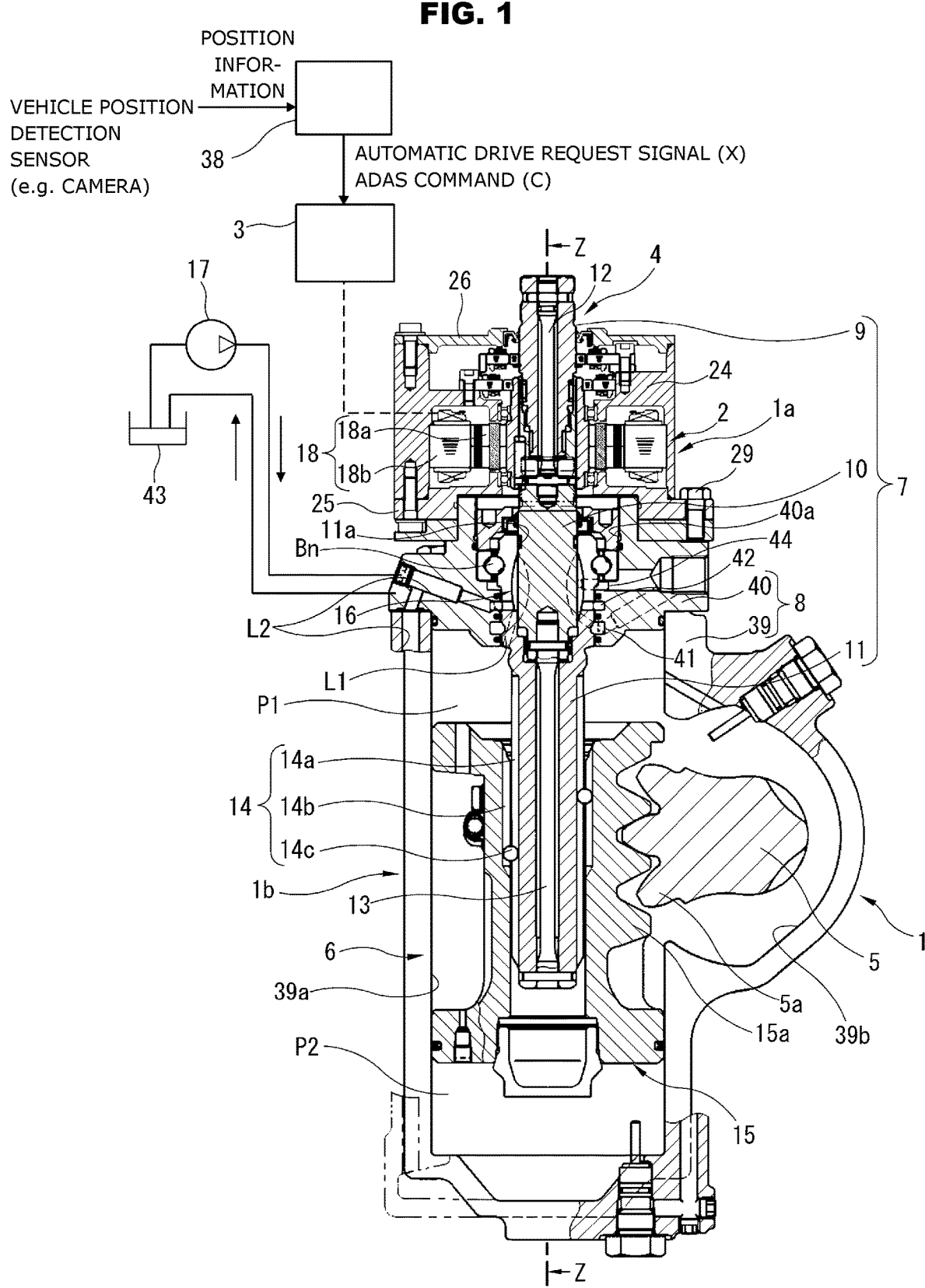
FIG. 1 is a longitudinal sectional view of a steering device according to a first embodiment.
Figure 2:
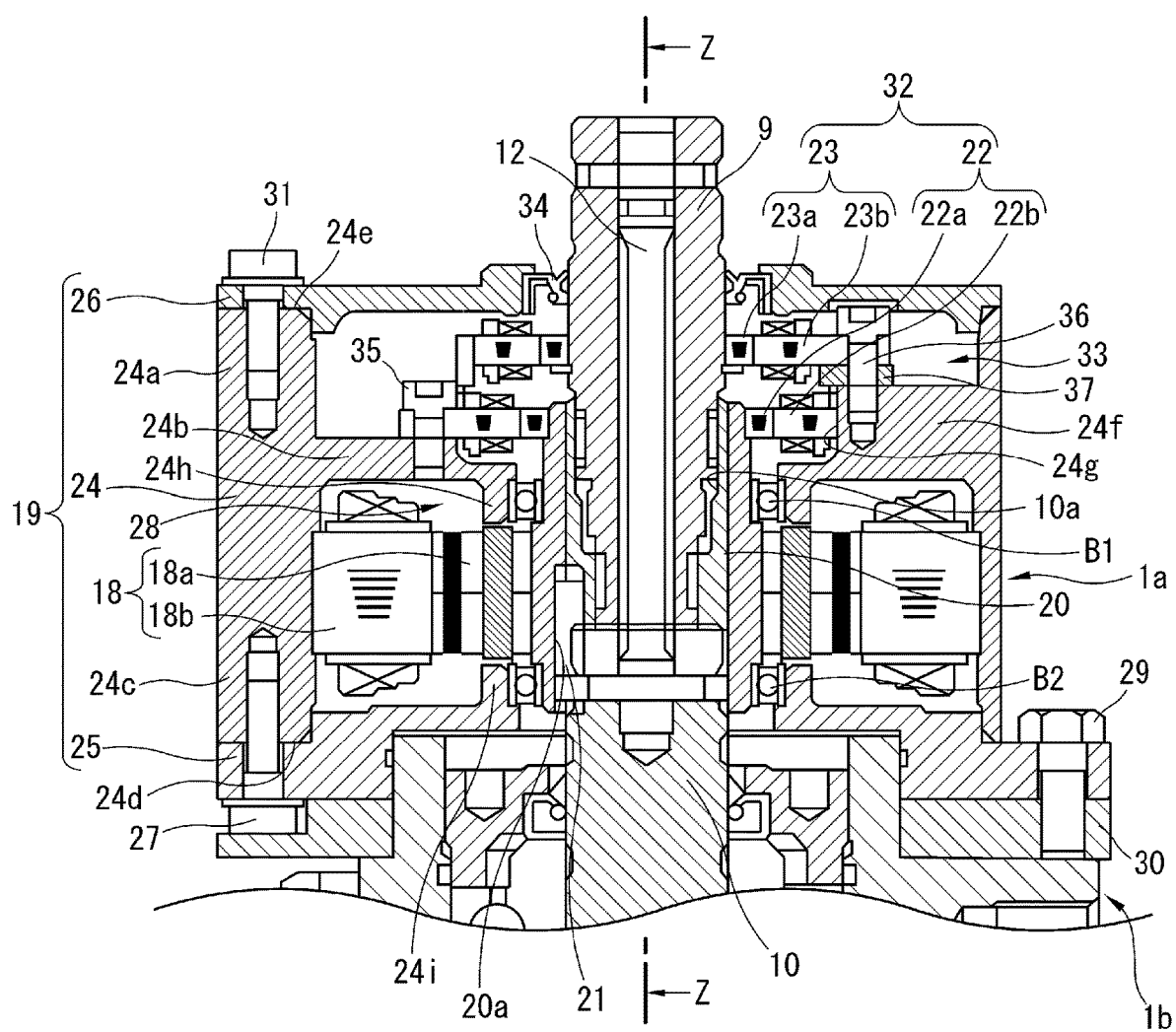
FIG. 2 is a partial enlarged view of the steering device shown in FIG. 1.

First Embodiment (Configurations of Steering Device) FIG. 1 is a longitudinal sectional view of a steering device according to the first embodiment. FIG. 2 is a partial enlarged view of the steering device shown in FIG. 1 which involves an electric motor 2. For convenience of explanation, upper and lower sides in FIG. 1 are respectively referred to as first and second sides. A steering shaft 7 includes a first-side end and a second-side end in a direction of a rotational axis Z of steering shaft 7, wherein the first-side end is linked to a steering wheel not shown, and the second-side end is linked to a piston 15.

The steering device is an integral type steering device to be employed in a large vehicle etc., and mainly includes a steering device body 1, the electric motor 2, and an EPS controller 3 (i.e., ECU).

Steering device body 1 includes a steering mechanism 4, a sector shaft 5, and a power cylinder 6.

Steering mechanism 4 receives rotational force from the steering wheel not shown, and includes steering shaft 7. Steering shaft 7 is partially contained in a housing 8, and includes an input shaft 9, an intermediate shaft 10, and an output shaft 11. Input shaft 9 includes a first-side end linked to the steering wheel and structured to receive steering torque from a driver, and includes a second-side end inserted in an open depression 10a formed in a first-side end of intermediate shaft 10. The first-side end of intermediate shaft 10 is relatively rotatably connected to input shaft 9 via a first torsion bar 12, and is structured to receive motor assist torque from electric motor 2 connected to an outer periphery of intermediate shaft 10. Intermediate shaft 10 is inserted in an open depression 11a formed in a diameter-expansion part of a first-side end of output shaft 11. The first-side end of output shaft 11 is relatively rotatably connected to intermediate shaft 10 via a second torsion bar 13, and is structured to receive the steering torque from intermediate shaft 10 and then output the steering torque to piston 15 via a ball screw mechanism 14 serving as a conversion mechanism.

Ball screw mechanism 14 is composed of output shaft 11 serving as a screw shaft, piston 15 serving as a nut, and balls 14c disposed between output shaft 11 and piston 15. Output shaft 11 includes a ball groove 14a that is a helical groove formed in an outer periphery of a second-side part of output shaft 11. Piston 15 is disposed to surround output shaft 11, and includes a ball groove 14*b* that is a helical groove formed in an inner periphery of piston 15 in correspondence to ball groove 14*a*.

Intermediate shaft 10 and output shaft 11 interpose a rotary valve 16 therebetween. Rotary valve 16 is a known control valve, and is structured to receive supply of hydraulic liquid from a pump device 17 mounted in a vehicle and then selectively supply the hydraulic liquid to a first liquid chamber P1 and a second liquid chamber P2 (i.e., pressure chambers) described below. The supply of hydraulic liquid from pump device 17 to rotary valve 16 depends on a torsion amount and a torsion direction of second torsion bar 13 that are calculated from a relative rotational angle between intermediate shaft 10 and output shaft 11.

Sector shaft 5 includes a sector gear 5*a*. Sector gear 5*a* engages with rack teeth 15*a* of piston 15 that is formed in an outer periphery of the second-side end of steering shaft 7. This causes sector shaft 5 to rotate in response to axial movement of piston 15. Sector shaft 5 is linked to the turning wheels via a pitman arm not shown, and serves for turning the turning wheels.

Thus, ball screw mechanism 14, sector shaft 5, and the pitman arm compose a transmitting mechanism structured to convert rotational force (i.e., steering force) inputted to steering shaft 7 to turning force for the turning wheels. In case of configuring the steering device without ball screw mechanism 14 etc., the above transmitting mechanism may be replaced with another mechanism such as a rack-and-pinion mechanism composed of a rack bar and a pinion shaft.

Piston 15 has a cylindrical shape, and is slidably contained in housing 8, and defines first liquid chamber P1 and second liquid chamber P2 that are a pair of liquid chambers. This forms power cylinder 6. Power cylinder 6 is an oil hydraulic actuator structured to generate hydraulic assist torque for assisting the steering torque.

Electric motor 2 (i.e., a hollow motor) is a three-phase alternating current type brushless motor structured to provide rotational torque for input shaft 9. Electric motor 2 includes a motor element 18 and a motor housing 19 containing motor element 18. Motor element 18 includes a motor rotor 18*a* and a motor stator 18*b*.

Motor rotor 18*a* is mounted to an outer periphery of input shaft 9 via a coupler 20 having a tubular shape, in order to allow motor rotor 18*a* to rotate integrally with input shaft 9. Motor stator 18*b* is disposed in an outer circumferential side with respect to motor rotor 18*a* so as to form a predetermined gap therebetween, and is electrically connected to EPS controller 3 disposed outside the housing 8.

Coupler 20 is fixed to intermediate shaft 10 via a known key connection. The key connection is formed by fitting a key 21 into a groove 20*a* wherein key 21 projects from the outer periphery of intermediate shaft 10 and groove 20*a* is formed in an inner peripheral surface of coupler 20. The key connection causes coupler 20 to rotate integrally with intermediate shaft 10, where coupler 20 is supported by a first bearing B1 and a second bearing B2.

Motor housing 19 is made of a metallic material such as an aluminum alloy, and includes a housing body 24, a first closure member 25, and a second closure member 26. Housing body 24 has a shape of a bottomed cylinder, and contains motor element 18 and first and second resolvers 22 and 23 described below. First closure member 25 closes an opening of housing body 24 from a side adjacent to electric motor 2. Second closure member 26 closes an opening of an extension part 24*a* of housing body 24 from a side opposite to electric motor 2.

Housing body 24 includes the extension part 24*a*, a bottom part 24*b*, and a tubular part 24*c*. Bottom part 24*b* has a substantially disc shape, and accepts insertion of input shaft 9 and coupler 20. Tubular part 24*c* has a cylindrical tubular shape, and extends from an outer rim of bottom part 24*b* toward the second-side end of steering shaft 7. Extension part 24*a* has a cylindrical tubular shape, and extends from the outer rim of bottom part 24*b* toward the first-side end of steering shaft 7.

Tubular part 24*c* includes the opening closed by first closure member 25 formed to have a substantially disc shape and accept insertion of input shaft 9 and coupler 20. First closure member 25 is mounted and fixed to an open end surface 24*d* of tubular part 24*c* with a fixing member such as a bolt 27. First closure member 25, bottom part 24*b*, tubular part 24*c*, and coupler 20 surround a space that serves as a motor container 28 to contain motor element 18. Furthermore, first closure member 25 is mounted and fixed to an adapter 30 with a fixing member such as a bolt 29. Thus, first closure member 25 is fixed to housing 8 via adapter 30.

The opening of extension part 24*a* is closed by second closure member 26 formed to have a substantially disc shape and accept insertion of input shaft 9 and coupler 20. Second closure member 26 is mounted and fixed to an open end surface 24*e* of extension part 24*a* with a fixing member such as a bolt 31. Second closure member 26, bottom part 24*b*, extension part 24*a*, and input shaft 9 surround a space that serves as a torque sensor container 33 to contain a torque sensor 32. Torque sensor 32 serves for calculation of a steering torque exerted on first torsion bar 12. Second closure member 26 and input shaft 9 have therebetween a gap sealed air-tightly by a seal 34 having an annular shape.

Torque sensor 32 includes first resolver 22 and second resolver 23. First resolver 22 is contained in torque sensor container 33 so as to face the outer periphery of coupler 20. Second resolver 23 is contained in torque sensor container 33 so as to face the outer periphery of input shaft 9.

First resolver 22 includes a first resolver rotor 22*a* and a first resolver stator 22*b*. First resolver rotor 22*a* is fixed to the outer periphery of a first-side end of coupler 20. First resolver stator 22*b* is disposed in the outer circumferential side with respect to first resolver rotor 22*a*, and is mounted and fixed to bottom part 24*b* with a fixing member such as a screw 35. In detail, first resolver stator 22*b* is mounted and fixed to bottom part 24*b* with screw 35, so as to stick against an inner peripheral surface 24*g* of a thick part 24*f* of bottom part 24*b* that overlaps with sector shaft 5 in the direction of rotational axis Z of steering shaft 7. Furthermore, first resolver stator 22*b* is electrically connected to EPS controller 3 via output wiring not shown. EPS controller 3 receives input of an intermediate shaft rotational angle θa (described below) of intermediate shaft 10 measured by first resolver 22.

Second resolver 23 includes a second resolver rotor 23*a* and a second resolver stator 23*b*. Second resolver rotor 23*a* is fixed to the outer periphery of input shaft 9, at a position nearer to the first-side end of steering shaft 7 than first resolver stator 22*b*. Second resolver stator 23*b* is disposed in the outer circumferential side with respect to second resolver rotor 23*a*, and is mounted and fixed to thick part 24*f* of housing body 24 with a fixing member such as a screw 36, via a spacer 37. Second resolver stator 23*b* is electrically connected to EPS controller 3 via output wiring not shown, similarly to first resolver stator 22*b*. EPS controller 3 receives input of an input shaft rotational angle θh (described below) of input shaft 9 measured by second resolver 23.

Torque sensor 32 including first resolver 22 and second resolver 23 calculates the steering torque by multiplying a difference between θa and θh by a torsional spring constant g1 of first torsion bar 12, where: θa is the intermediate shaft rotational angle of intermediate shaft 10 measured by first resolver 22; and θh is the input shaft rotational angle of input shaft 9 measured by second resolver 23.

First resolver stator 22b of first resolver 22 and second resolver stator 23b of second resolver 23 output sine wave and cosine wave signals satisfying a condition of "(an amplitude Ax per rotation of first resolver rotor 22a) <360°/(a predetermined angle θx×2)". From these output signals, EPS controller 3 calculates rotational angles of input shaft 9 and electric motor 2.

First bearing B1 is disposed in an inner peripheral surface of a first bearing retention part 24h, and rotatably supports a first-side part of coupler 20. First bearing retention part 24h has an annular shape, and projects from a vicinity of an inner rim of bottom part 24b toward the second-side end of steering shaft 7.

Similarly, second bearing B2 is disposed in an inner peripheral surface of a second bearing retention part 24i, and rotatably supports a second-side part of coupler 20. Second bearing retention part 24i has an annular shape, and projects from a vicinity of an inner rim of first closure member 25 so as to face first bearing retention part 24h.

EPS controller 3 is a control unit including electronic components such as a microcomputer not shown. EPS controller 3 receives input of: steering torque Tr measure by torque sensor 32; a vehicle speed V measured by a vehicle speed sensor not shown; a steering angle θr measured by a steering angle sensor not shown; and an engine speed N. Furthermore, EPS controller 3 is electrically connected to an ADAS controller 38 configured to perform control for automatic driving (i.e., automatic steering) of the vehicle such as parking and lane-keeping, in response to satisfaction of a condition that a driver turns ON an automatic drive switch.

ADAS controller 38 perceives circumstances surrounding the vehicle based on a measurement signal from a radar (e.g., a millimeter wave radar or an infrared ray radar) not shown, an image from a camera not shown, etc., and perceives a position of the vehicle based on vehicle position information from a GPS etc. During automatic steering such as lane-keeping of the vehicle, ADAS controller 38 calculates an ADAS command C from the surrounding circumstances and the position of the vehicle, wherein the ADAS command C is a steering angle command serving as a target steering angle for maintaining the vehicle within a lane. Moreover, ADAS controller 38 generates an automatic drive request signal X in response to a driver turning ON the automatic drive switch, and sends the automatic drive request signal X to EPS controller 3 by CAN communication. Furthermore, ADAS controller 38 generates additional information such as an ADAS switching signal for turning ON and OFF the ADAS, a value from a message counter for determining accuracy of CAN communication, etc., and sends the additional information to EPS controller 3 by CAN communication.

Housing 8 has a shape of a tube including a first-side end being open and a second-side end being closed, and includes a first housing 39 and a second housing 40. First housing 39 defines first liquid chamber P1 and second liquid chamber P2. Second housing 40 closes an opening of a first-side end of first housing 39, and contains rotary valve 16. First housing 39 and second housing 40 are fastened to each other with fixing means not shown such as bolts appropriately disposed in outer peripheries of first housing 39 and second housing 40.

First housing 39 internally includes a power cylinder body 39a and a shaft container 39b. Power cylinder body 39a extends in the direction of rotational axis Z of steering shaft 7. Shaft container 39b extends perpendicularly to power cylinder body 39a, and includes a part adjacent to power cylinder body 39a. Power cylinder body 39a contains piston 15 linked to output shaft 11, and thereby defines first liquid chamber P1 and second liquid chamber P2 with piston 15. Shaft container 39b contains sector shaft 5 including a pair of axial ends one of which is linked to piston 15 while the other is linked to the turning wheels via the pitman arm not shown.

Piston 15 includes rack teeth 15a in its outer periphery. Sector shaft 5 includes a sector gear 5a in its outer periphery. Rack teeth 15a and sector gear 5a engage with each other. This causes sector shaft 5 to rotate in response to axial movement of piston 15. The rotation of sector shaft 5 pulls the pitman arm in a vehicle width direction, and thereby turns the turning wheels. On this occasion, the hydraulic liquid in first liquid chamber P1 is introduced into shaft container 39b, and serves for lubrication between rack teeth 15a and sector gear 5a.

Second housing 40 includes in its inner periphery a shaft insertion hole 40a in which intermediate shaft 10 and output shaft 11 overlapping with each other are inserted. Shaft insertion hole 40a extends through second housing 40 in the direction of rotational axis Z, while decreasing in diameter to form a step as going in a direction from the first side to the second side. Accordingly, shaft insertion hole 40a includes a large diameter part in the first side and a small diameter part in the second side. The large diameter part includes a bearing Bn rotatably supporting output shaft 11. The small diameter part includes an introduction port 41, a supply-and-discharge port 42, and a discharge port 44. Introduction port 41 is in communication with pump device 17. Supply-and-discharge port 42 performs supply to and discharge from liquid chambers P1 and P2 of liquid pressure introduced via introduction port 41. Discharge port 44 performs discharge to a reservoir tank 43 of hydraulic liquid discharged from liquid chambers P1 and P2 via supply-and-discharge port 42. Supply-and-discharge port 42 is in communication with first liquid chamber P1 via a first supply-and-discharge passage L1 disposed in a first-side diameter-expanded part of output shaft 11, and is in communication with second liquid chamber P2 via a second supply-and-discharge passage L2 disposed in an internal part of first housing 39.

According to the above configurations of the steering device, in response to operation of the steering wheel by a driver, hydraulic liquid pumped by pump device 17 is supplied, via rotary valve 16, to one of first liquid chamber P1 and second liquid chamber P2 depending on a direction of steering, while excessive hydraulic liquid corresponding to an amount of the supply is discharged from the other of first liquid chamber P1 and second liquid chamber P2 to reservoir tank 43. Then, liquid pressure of the hydraulic liquid moves piston 15, and sector shaft 5 receives a liquid pressure assist torque depending on the liquid pressure exerted on piston 15.

Figure 3:
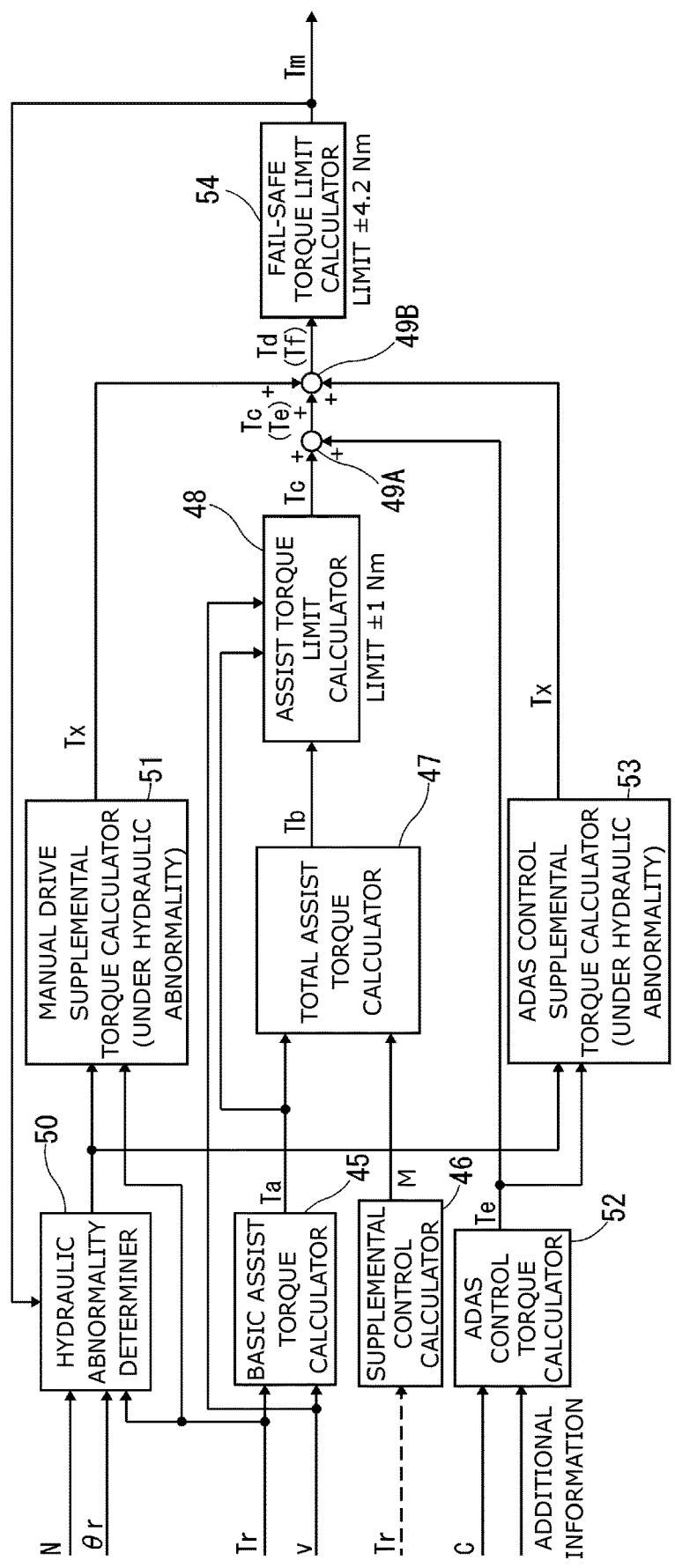
FIG. 3 is a control block diagram according to the first embodiment.
Figure 4:
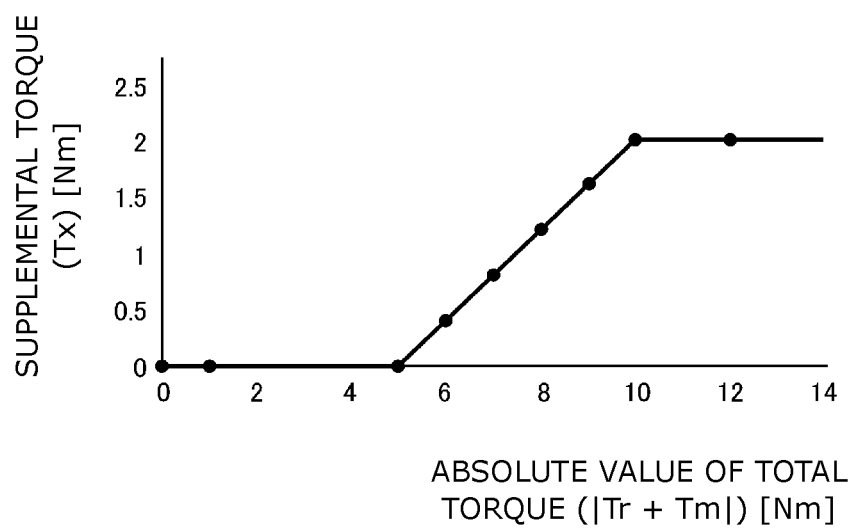
FIG. 4 is a map used in a manual drive supplemental torque calculator and an ADAS control supplemental torque calculator.

FIG. 3 is a control block diagram according to the first embodiment. FIG. 4 is a map used in a manual drive supplemental torque calculator 51 and an ADAS control supplemental torque calculator 53.

The control block diagram of FIG. 3 is based on an example of increasing a motor assist torque command value (hereinafter referred to as a motor assist torque Tm) for electric motor 2 in case that the hydraulic abnormality in the pair of liquid chambers P1 and P2 is present due to a cause such as a failure in a component (e.g., power cylinder 6, rotary valve 16, pump device 17, etc.). Furthermore, the example of FIG. 3 is configured to switch calculation of motor assist torque Tm between a manual drive mode and an automatic drive mode by interposing a switch not shown for the switching between the manual drive mode and the automatic drive mode, in a vicinity of a second adder 49B described below.

EPS controller 3 includes a basic assist torque calculator 45, a supplemental control calculator 46, a total assist torque calculator 47, an assist torque limit calculator 48, a first adder 49A, the second adder 49B, a hydraulic abnormality determiner 50, a supplemental torque calculator 51 for manual driving under hydraulic abnormality (hereinafter referred to as manual drive supplemental torque calculator 51), an ADAS control torque calculator 52, a supplemental torque calculator 53 for ADAS control under hydraulic abnormality (hereinafter referred to as ADAS control supplemental torque calculator 53), and a fail-safe torque limit calculator 54.

Basic assist torque calculator 45 is used in the manual drive mode, and generates a predetermined map of a basic assist torque Ta with respect to steering torque Tr and vehicle speed V, based on steering torque Tr and vehicle speed V. Basic assist torque Ta has a value exemplarily within a range of 0 Nm to 1 Nm, and is outputted to total assist torque calculator 47.

Supplemental control calculator 46 is a calculator exemplarily for phase compensation that calculates a compensation value M based on steering torque Tr. Compensation value M is outputted to total assist torque calculator 47 and added to basic assist torque Ta, and thereby serves to improve responsiveness of motor assist force in response to torque change in steering torque Tr. Supplemental control calculator 46 is not limited to the calculator for phase compensation, but may be another calculator such as a calculator for return angle control that serves for a predetermined control on return angle.

Total assist torque calculator 47 adds compensation value M to basic assist torque Ta, and thereby generates an after-addition motor assist torque Tb. After-addition motor assist torque Tb is outputted to assist torque limit calculator 48.

Assist torque limit calculator 48 performs limit processing of after-addition motor assist torque Tb within a range of ±1 Nm, based on basic assist torque Ta and vehicle speed V, and thereby generates an after-limit-processing motor assist torque Tc. After-limit-processing motor assist torque Tc is outputted to second adder 49B via first adder 49A.

Hydraulic abnormality determiner 50 is configured to determine the hydraulic abnormality to be present in the pair of liquid chambers P1 and P2, in response to satisfaction of a first abnormality determination condition or a second abnormality determination condition described below in a state in which the steering device is under normal control. The condition of "under normal control" means a condition that the normal control is indicated by a known state machine installed in EPS controller 3. If hydraulic abnormality determiner 50 determines the hydraulic abnormality to be present in the pair of liquid chambers P1 and P2, hydraulic abnormality determiner 50 shifts to a hydraulic abnormality mode, and calculates a supplemental torque Tx in manual drive supplemental torque calculator 51 in case of manual driving, and calculates the supplemental torque Tx in ADAS control supplemental torque calculator 53 in case of automatic driving.

The first abnormality determination condition is that: an absolute value |Tr+Tm| of a total torque Tr+Tm (i.e., a torque actually exerted on the hydraulic gear) of steering torque Tr and motor assist torque Tm is greater than a predetermined threshold torque, e.g., 8 Nm in the present embodiment; and an absolute value |Vr| of a steering speed Vr is less than a predetermined threshold steering speed, e.g., 90 deg/s in the present embodiment. The threshold steering speed is set to be considerably smaller than a steering speed (e.g., 800 deg/s) causable in case that steering shaft 7 is steered with 8 Nm under no hydraulic abnormality in liquid chambers P1 and P2. The threshold steering speed has little impact on the determination of hydraulic abnormality, although being helpful to find a shortage of liquid pressure. Thus, the determination of hydraulic abnormality considerably depends on the threshold torque. The threshold steering speed is not an essential condition, but is merely a condition to slightly help the determination of hydraulic abnormality.

The second abnormality determination condition is that engine speed N is less than 100 rpm. This is because pump device 17 increases in pump output with increase in engine speed N. If engine speed N is less than 100 rpm, the pump output is determined to be insufficient to provide the hydraulic assist torque, and the hydraulic abnormality in liquid chambers P1 and P2 is determined to be present.

Manual drive supplemental torque calculator 51 is used in the manual drive mode, and outputs supplemental torque Tx to second adder 49B based on a map (shown in FIG. 4) of supplemental torque Tx with respect to absolute value |Tr+Tm| of total torque Tr+Tm, in response to satisfaction of the condition that hydraulic abnormality determiner 50 determines the hydraulic abnormality to be present. Supplemental torque Tx is set to a value sufficient to compensate a shortage of the hydraulic assist torque under the hydraulic abnormality.

As shown in the map of FIG. 4, in case that absolute value |Tr+Tm| of total torque Tr+Tm is equal to or greater than 0 Nm and equal to or less than 5 Nm, supplemental torque Tx is 0 Nm. In case that absolute value |Tr+Tm| is greater than 5 Nm and equal to or less than 10 Nm, supplemental torque Tx linearly increases from 0 Nm to 2 Nm. In case that absolute value |Tr+Tm| is greater than 10 Nm, supplemental torque Tx is maintained at 2 Nm and unchanged.

Supplemental torque Tx obtained in manual drive supplemental torque calculator 51 is added to after-limit-processing motor assist torque Tc in second adder 49B. This generates a first after-supplement motor assist torque Td.

ADAS control torque calculator 52 is used in the automatic drive mode, and calculates an ADAS control torque Te based on ADAS command C and additional information such as the ADAS switching signal and the value from the message counter described above. ADAS control torque Te is outputted to first adder 49A and ADAS control supplemental torque calculator 53. During automatic driving, steering torque Tr is zero because of absence of steering by a driver. This causes sections from supplemental control calculator 46 to assist torque limit calculator 48 to stop their calculation, and thereby causes first adder 49A to receive ADAS control torque Te only. First adder 49A outputs the ADAS control torque Te to second adder 49B.

ADAS control supplemental torque calculator 53 is used in the automatic drive mode, and generates supplemental torque Tx based on the map in FIG. 4 of supplemental torque Tx with respect to absolute value |Tr+Tm| of total torque Tr+Tm, in response to satisfaction of the condition that hydraulic abnormality determiner 50 determines the hydraulic abnormality to be present in the pair of liquid chambers P1 and P2. This supplemental torque Tx is outputted to second adder 49B, and is added to ADAS control torque Te in second adder 49B. This generates a second after-supplement motor assist torque Tf.

Fail-safe torque limit calculator 54 generates a motor assist torque Tm by performing limit processing of after-supplement motor assist torques Td and Tf after the addition of supplemental torque Tx, within a range of ±4.2 Nm, in response to satisfaction of a predetermined limit-processing condition. The predetermined limit-processing condition is, for example, that a hardware abnormality in EPS controller 3 such as excessive rise in temperature in EPS controller 3 is present. If the condition is satisfied, the limit processing is executed for narrowing down to a limit. Motor assist torque Tm is outputted to electric motor 2 (see FIGS. 1 and 2) while fed back to hydraulic abnormality determiner 50.

The hydraulic abnormality mode is cancelled in response to continuation of satisfaction of a first deactivation condition or a second deactivation condition (described below) for or over 800 ms under execution of supplemental torque control in manual drive supplemental torque calculator 51 or in ADAS control supplemental torque calculator 53.

The first deactivation condition is detection of presence of an internal failure in an AHPS (i.e., an electric power steering). For example, the first deactivation condition is satisfied in case that electric motor 2 of the electric power steering is determined to have a failure in an electric system thereof, by monitoring a current and a voltage with an ammeter and a voltmeter not shown. The first deactivation condition is set as above because motor assist torque Tm of electric motor 2 cannot be increased in case that electric motor 2 is out of order.

The second deactivation condition is that: engine speed N is greater than 400 rpm; vehicle speed V is greater than 20 km/h; an absolute value |θr| of steering angle θr is greater than 30 degrees; an absolute value |Tr| of steering torque Tr is less than 5 Nm; and steering angle θr and steering torque Tr coincide with each other in signs of positive or negative. The second deactivation condition is set as above because the steering device can be operated without execution of the supplemental torque control in case that the second deactivation condition is satisfied. Specifically, in case that the second deactivation condition is satisfied, engine speed N is high and pump device 17 is working sufficiently to provide the hydraulic assist torque.

Figure 5:
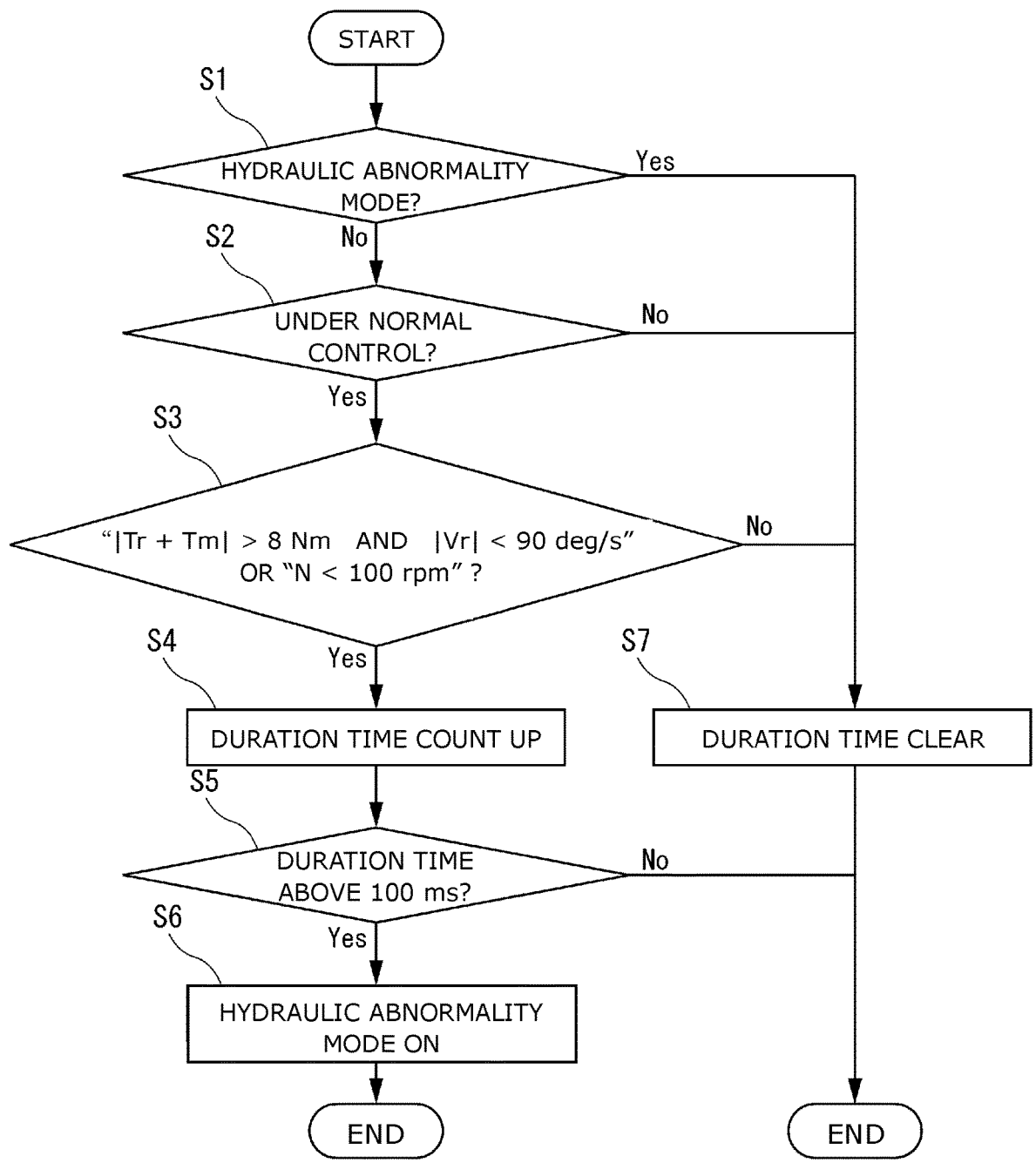
FIG. 5 is a flow chart showing processes for activating a hydraulic abnormality mode of a hydraulic abnormality determiner.

FIG. 5 is a flow chart showing processes for activating the hydraulic abnormality mode of hydraulic abnormality determiner 50.

Step S1 determines whether the hydraulic abnormality mode is active. If the hydraulic abnormality mode is active, step S7 is executed to clear a duration time, and then the present flow is ended. If the hydraulic abnormality mode is not active, step S2 is executed.

Step S2 determines whether the steering device is under the normal control, with use of the known state machine. If the steering device is under the normal control, step S7 is executed to clear the duration time, and then the present flow is ended. If the steering device is not under the normal control, step S3 is executed.

Step S3 determines whether the first abnormality determination condition or the second abnormality determination condition is satisfied or not, with use of hydraulic abnormality determiner 50. Specifically, this is determination of whether one of the following two conditions is satisfied: the condition that absolute value |Tr+Tm| of total torque Tr+Tm is greater than 8 Nm and absolute value | Vr| of steering speed Vr is less than 90 deg/s; and the condition that engine speed N is less than 100 rpm. If determined NO in step S3, step S7 is executed to clear the duration time, and then the present flow is ended. If determined YES in step S3, step S4 is executed.

Step S4 starts counting up of the duration time of satisfaction of the first abnormality determination condition or the second abnormality determination condition. Then, if step S5 determines the duration time to be shorter than 100 ms, step S7 is executed to clear the duration time, and then the present flow is ended. If step S5 determines the duration time to be equal to or longer than 100 ms, step S6 is executed.

Step S6 turns ON the hydraulic abnormality mode on a premise that the hydraulic abnormality is present. Then, supplemental torque Tx is calculated in manual drive supplemental torque calculator 51 or ADAS control supplemental torque calculator 53 with use of the map shown in FIG. 4.

Figure 6:
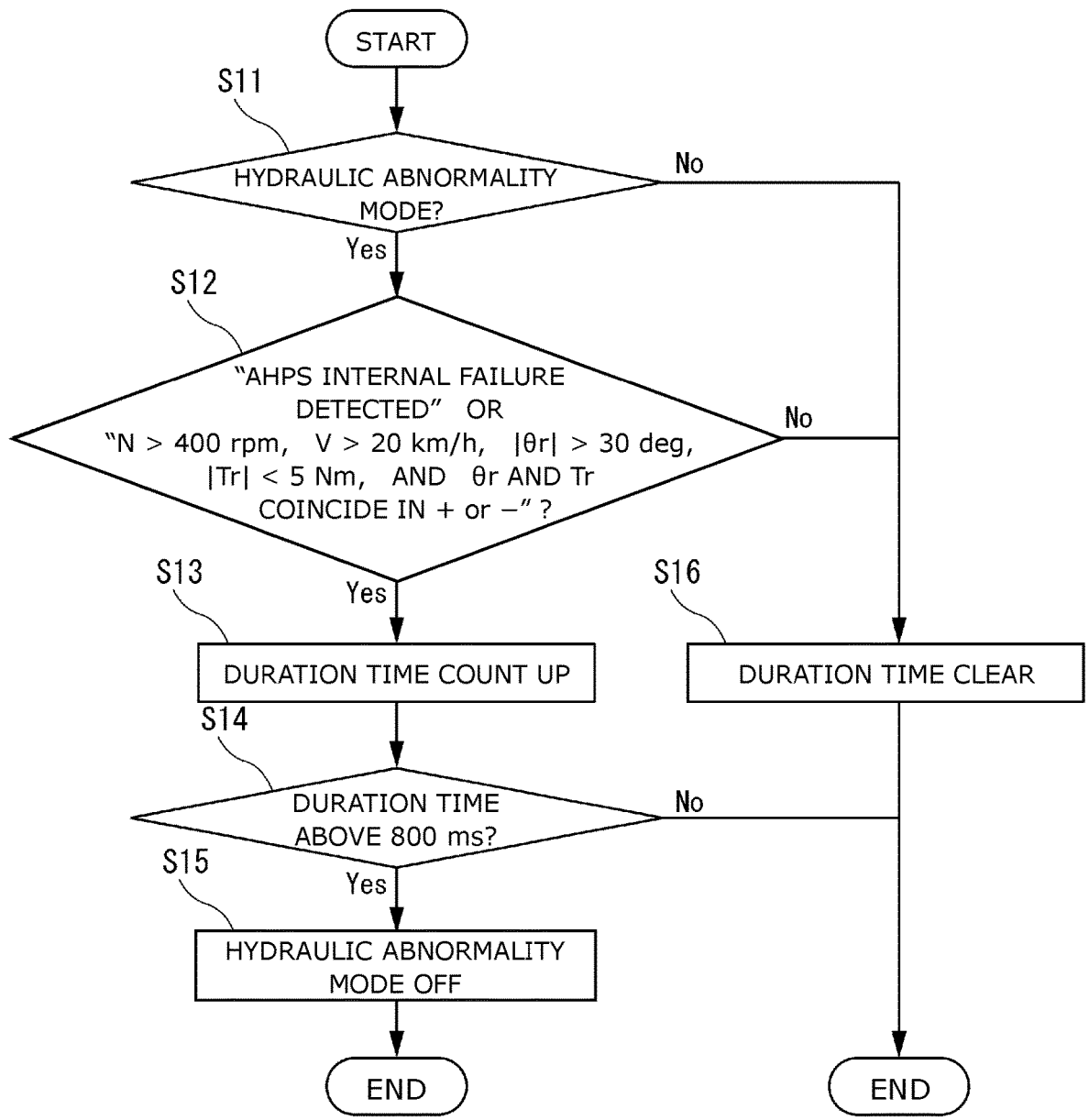
FIG. 6 is a flow chart showing processes for deactivating the hydraulic abnormality mode of the hydraulic abnormality determiner.

FIG. 6 is a flow chart showing processes for deactivating the hydraulic abnormality mode of hydraulic abnormality determiner 50.

First, step S11 determines whether the hydraulic abnormality mode is active. If the hydraulic abnormality mode is not active, step S16 is executed to clear a duration time, and then the present flow is ended. If the hydraulic abnormality mode is active, step S12 is executed.

Step S12 determines whether the first deactivation condition or the second deactivation condition of the hydraulic abnormality mode is satisfied or not. Specifically, this is determination of whether one of the following two conditions is satisfied: the condition that presence of an internal failure in the AHPS is detected; and the condition that engine speed N is greater than 400 rpm, vehicle speed V is greater than 20 km/h, absolute value |θr| of steering angle θr is greater than 30 degrees, absolute value |Tr| of steering torque Tr is less than 5 Nm, and steering angle θr and steering torque Tr coincide with each other in signs of positive or negative. If determined NO in step S12, step S16 is executed to clear the duration time, and then the present flow is ended. If determined YES in step S12, step S13 is executed.

Step S13 starts counting up of the duration time of satisfaction of the first deactivation condition or the second deactivation condition of the hydraulic abnormality mode. Then, if step S14 determines the duration time to be shorter than 800 ms, step S16 is executed to clear the duration time, and then the present flow is ended. If step S14 determines the duration time to be equal to or longer than 800 ms, step S15 is executed.

Step S15 turns OFF the hydraulic abnormality mode on a premise that the hydraulic abnormality is absent. Then, the calculation of supplemental torque Tx based on the map of FIG. 4 is stopped.

Effects of First Embodiment

According to the first embodiment, the steering device includes hydraulic abnormality determiner 50 that can determine presence of the hydraulic abnormality in liquid chambers P1 and P2 when absolute value |Tr+Tm| of total torque Tr+Tm is greater than 8 Nm. If hydraulic abnormality determiner 50 determines the hydraulic abnormality to be present, supplemental torque Tx is obtained, and motor assist torque Tm of electric motor 2 is increased. During manual driving, supplemental torque Tx is obtained based on absolute value |Tr+Tm| of total torque Tr+Tm. During automatic driving, supplemental torque Tx is obtained based only on motor assist torque Tm, because steering torque Tr is zero and thereby absolute value |Tr+Tm| of total torque Tr+Tm depends only on motor assist torque Tm. These configurations serve to increase motor assist torque Tm by supplemental torque Tx and stabilize steering by a driver even under the hydraulic abnormality, during both manual driving and automatic driving.

According to the first embodiment, hydraulic abnormality determiner 50 determines the hydraulic abnormality to be present, in response to satisfaction of the condition that absolute value |Tr+Tm| of total torque Tr+Tm is greater than 8 Nm while absolute value |Vr| of steering speed Vr is less than 90 deg/s. This configuration of considering absolute value |Vr| of steering speed Vr in addition to absolute value |Tr+Tm| of total torque Tr+Tm serves to efficiently determine presence or absence of the hydraulic abnormality.

According to the first embodiment, EPS controller 3 stops generating supplemental torque Tx and increasing motor assist torque Tm of electric motor 2, in response to satisfaction of the condition that absolute value |Tr+Tm| of total torque Tr+Tm is equal to or greater than 0 Nm and equal to or less than 5 Nm.

In the manual drive mode, the reason why not generating supplemental torque Tx in case that absolute value |Tr+Tm| of total torque Tr+Tm is equal to or greater than 0 Nm and equal to or less than 5 Nm is that supplemental torque Tx is considered unnecessary within the range of 0 Nm to 5 Nm that is generally a range of steering by a human. Even in case of wrongly determining the hydraulic abnormality to be present despite a sufficient liquid pressure under absolute value |Tr+Tm| of total torque Tr+Tm equal to or greater than 0 Nm and equal to or less than 5 Nm, the configuration of not generating supplemental torque Tx serves to suppress a driver from undergoing a strange feeling about steering due to excessive assist torque exerted by liquid pressure and electric motor 2.

In the automatic drive mode, the reason why supplemental torque Tx is set to zero in case that absolute value |Tr+Tm| of total torque Tr+Tm is equal to or greater than 0 Nm and equal to or less than 5 Nm, i.e., in case that ADAS control torque Te is equal to or greater than 0 Nm and equal to or less than 5 Nm (steering torque Tr is zero during the ADAS control) is that the ADAS control is not performed in the range of 0 Nm to 5 Nm.

Second Embodiment

Differently from the first embodiment, the second embodiment is configured such that hydraulic abnormality determiner 50 is configured to determine the hydraulic abnormality to be present in the pair of liquid chambers P1 and P2, in response to satisfaction of a condition that absolute value |Vr| of steering speed Vr of steering shaft 7 is less than an arbitrary steering speed set between 90 to 360 deg/s.

In general, steering torque Tr required of a driver under normal liquid pressure is less than 5 Nm. However, even under normal liquid pressure, steering torque Tr may exceed 5 Nm (i.e., catch up) during steering at a high speed (e.g., over approximately 500 deg/s), due to a shortage in amount of hydraulic liquid supplied by pump device 17. In case of steering torque Tr greater than 8 Nm, it is difficult to distinguish presence of the hydraulic abnormality from the hydraulic liquid shortage due to high speed steering. Accordingly, the second embodiment is configured to set an upper limit to 360 deg/s that is smaller than approximately 500 deg/s above which the hydraulic liquid shortage is expected to occur. This serves to eliminate wrong determination due to the hydraulic liquid shortage.

In cases other than the high speed steering, accuracy of the hydraulic abnormality determination majorly depends on the threshold steering torque, and hardly depends on absolute value |Vr| of steering speed Vr.

Effects of Second Embodiment

The second embodiment is configured to determine the hydraulic abnormality in liquid chambers P1 and P2 to be present, in response to satisfaction of the condition that absolute value |Vr| of steering speed Vr of steering shaft 7 is less than an arbitrary steering speed set between 90 to 360 deg/s. This serves to determine presence of the hydraulic abnormality in liquid chambers P1 and P2 without wrong determination caused by the hydraulic liquid shortage due to high speed steering, and thereby improve accuracy of the hydraulic abnormality determination.

Third Embodiment

Differently from the first embodiment, the third embodiment is configured such that hydraulic abnormality determiner 50 is configured to determine the hydraulic abnormality to be present in the pair of liquid chambers P1 and P2, in response to satisfaction of a condition that absolute value |Tr+Tm| of total torque Tr+Tm is greater than an arbitrary torque set between 7 Nm to 12 Nm. This allows various steering devices to have variety in threshold torque and thereby flexibly adapt to criteria for abnormality determination that may be different device by device.

Effects of Third Embodiment

Also hydraulic abnormality determiner 50 according to the third embodiment serves to increase motor assist torque Tm by supplemental torque Tx and stabilize steering by a driver even under the hydraulic abnormality, during both manual driving and automatic driving.

Fourth Embodiment

Differently from the first embodiment, the fourth embodiment is configured such that EPS controller 3 stops generating supplemental torque Tx and increasing motor assist torque Tm of electric motor 2, in response to satisfaction of a condition that absolute value |Tr+Tm| of total torque Tr+Tm is equal to or less than an arbitrary torque set between 4 Nm to 8 Nm. This allows various steering devices to have variety in criteria for deactivating generation of supplemental torque Tx and thereby flexibly adapt to the deactivation criteria that may be different device by device.

Effects of Fourth Embodiment

According to also the fourth embodiment, even in case of wrongly determining the hydraulic abnormality to be present despite a sufficient liquid pressure, the configuration of not generating supplemental torque Tx serves to suppress a driver from undergoing a strange feeling about steering due to excessive assist torque exerted by liquid pressure and electric motor 2.

Fifth Embodiment

Figure 7:
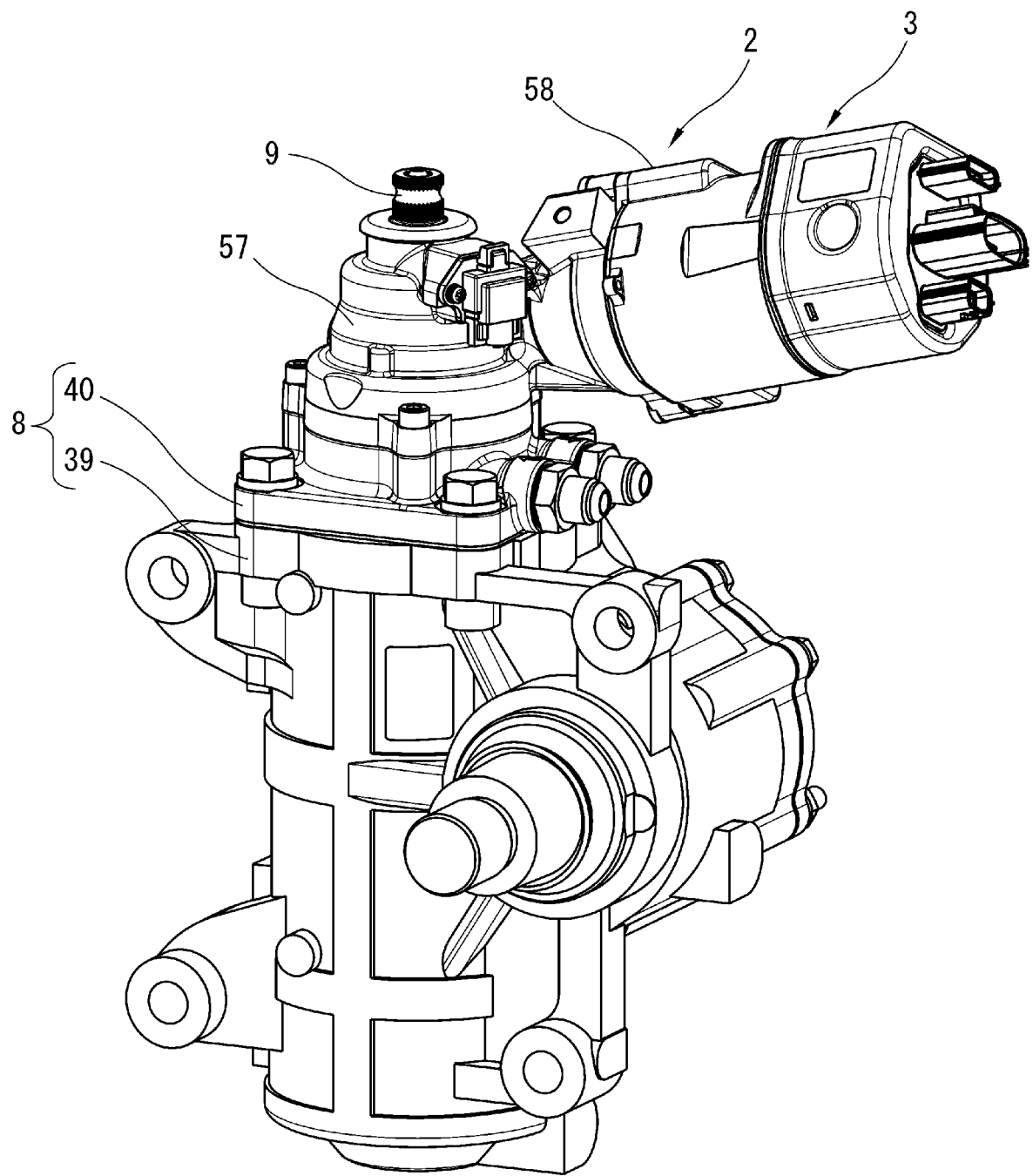
FIG. 7 is a perspective view of a steering device according to a fifth embodiment.
Figure 8:
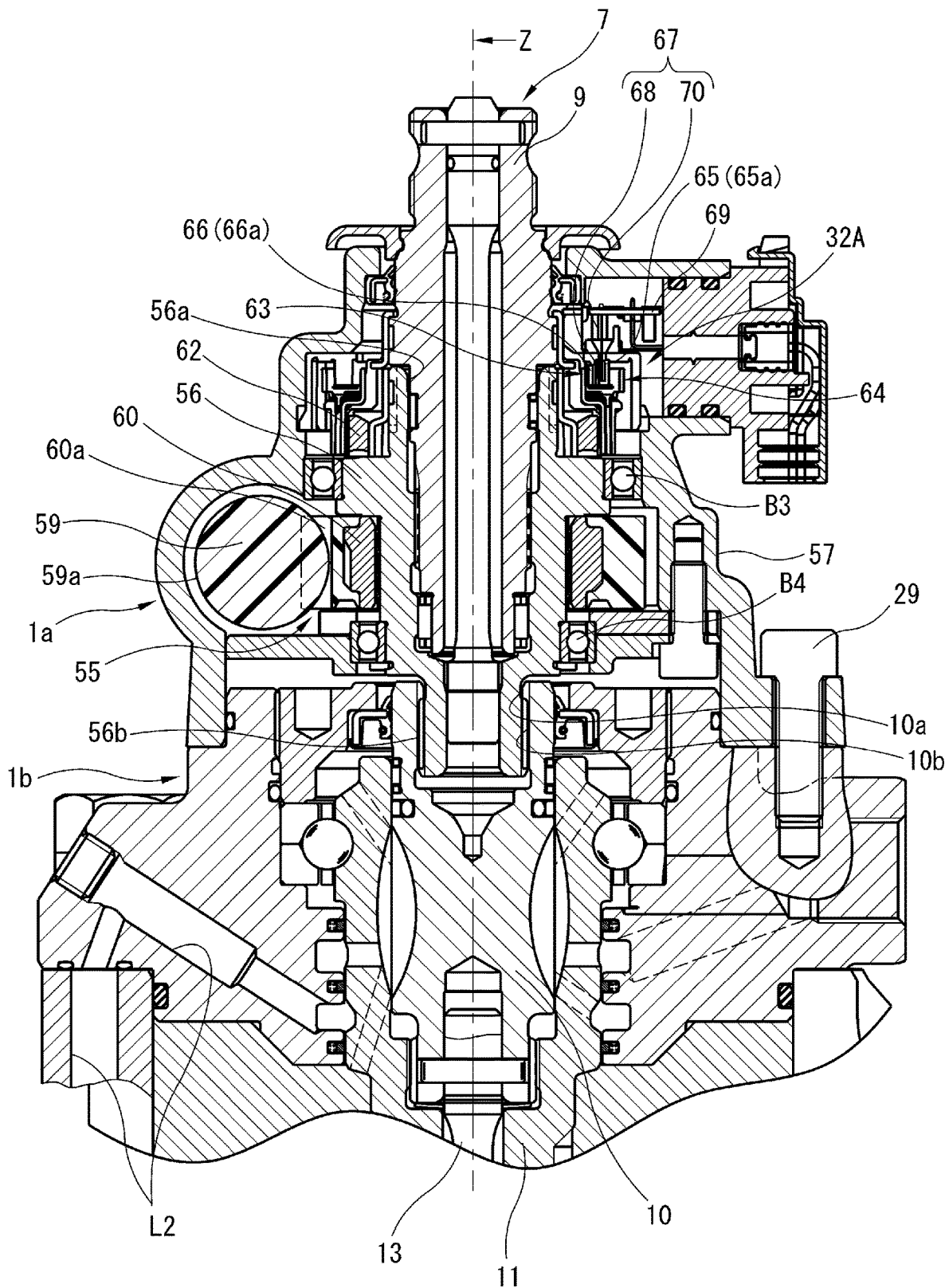
FIG. 8 is a partial longitudinal sectional view of the steering device according to the fifth embodiment.

FIG. 7 is a perspective view of a steering device according to the fifth embodiment. FIG. 8 is a partial longitudinal sectional view of the steering device according to the fifth embodiment.

According to the fifth embodiment, electric motor 2 is a non-hollow motor, and is connected to a connection shaft 56 disposed around input shaft 9, via a speed reducer 55 including a worm gear composed of a worm shaft 59 and a worm wheel 60 engaging with each other.

Electric motor 2 is integrated with EPS controller 3, and is contained in a motor housing 58 integrated with an input-side housing 57 containing input shaft 9. Electric motor 2 includes a motor shaft not shown including an axial end connected to a worm shaft 59. Worm shaft 59 includes a worm 59a in its outer periphery. Worm 59a engages with helical teeth 60a of worm wheel 60. Worm wheel 60 is connected to an outer periphery of connection shaft 56 by known key connection via a key not shown. Connection shaft 56 includes an axial first-side end surface including a depression 56a to which a partial region of an axial second-side part of input shaft 9 is fitted. Connection shaft 56 includes an axial second-side end including an external screw 56b. External screw 56b is screwed in an internal screw 10b of open depression 10a formed in the axial first-side end surface of intermediate shaft 10. Connection shaft 56 is rotatably supported by a third bearing B3 and a fourth bearing B4. Third bearing B3 is disposed on an outer peripheral surface of an axial first-side part of connection shaft 56. Fourth bearing B4 is disposed on an outer peripheral surface of an axial second-side part of connection shaft 56.

Torque sensor 32A has an annular shape, and is disposed around connection shaft 56 fixed to the outer periphery of input shaft 9, wherein first torsion bar 12 extends through an interior of the annular shape of torque sensor 32A. Torque sensor 32A mainly includes a permanent magnet 62, a pair of first and second yokes 63 and 64, a pair of first and second magnetism collection rings 65 and 66, and a magnetic sensor 67. Each of permanent magnet 62, yokes 63 and 64, and magnetism collection rings 65 and 66 is disposed on a circle centered substantially on rotational axis Z of steering shaft 7.

Permanent magnet 62 is a magnetic member made of a magnetic material, and has a cylindrical shape, and is mounted and fixed to the outer periphery of the first-side end of connection shaft 56. Permanent magnet 62 has north poles and south poles that are alternately arranged (i.e., magnetized) in a circumferential direction of permanent magnet 62.

Each of first and second yokes 63 and 64 is made of a soft magnetic material, and has a substantially cylindrical shape. Each of first and second yokes 63 and 64 includes a first end directed toward intermediate shaft 10 and aligned in the circumferential direction and disposed to face permanent magnet 62 in a radial direction. Furthermore, each of first and second yokes 63 and 64 includes a second end, wherein the second end of first yoke 63 disposed in the inner circumferential side and the second end of second yoke 64 disposed in the outer circumferential side face each other in the radial direction.

Each of first and second magnetism collection rings 65 and 66 is a substantially annular ring, and is disposed between the second ends of first and second yokes 63 and 64 in the radial direction. First and second magnetism collection rings 65 and 66 collect, within a predetermined region, a magnetic flux of permanent magnet 62 that leaks toward the second ends of first and second yokes 63 and 64. First magnetism collection ring 65 and second magnetism collection ring 66 are disposed in the outer circumferential side and the inner circumferential side respectively, and face each other in the radial direction. First magnetism collection ring 65 and second magnetism collection ring 66 interpose a Hall element 68 in the radial direction. First magnetism collection ring 65 includes a magnetism collection part 65a at a predetermined circumferential position in first magnetism collection ring 65. Magnetism collection part 65a is pressed inwardly in the radial direction. Second magnetism collection ring 66 includes a magnetism collection part 66a at a circumferential position in second magnetism collection ring 66 facing magnetism collection part 65a. Magnetism collection part 66a projects outwardly in the radial direction.

Magnetic sensor 67 includes the Hall element 68 and a connection terminal 70. Hall element 68 is contained in a gap in the radial direction between magnetism collection part 65a and magnetism collection part 66a. Connection terminal 70 connects Hall element 68 to a control board 69 disposed above torque sensor 32A. Magnetic sensor 67 measures a magnetic flux passing through a region between magnetism collection part 65a and magnetism collection part 66a, by utilizing Hall effect in Hall element 68 with use of Hall element 68, and outputs a signal depending on the magnetic flux to control board 69. From this, control board 69 calculates the relative rotational angle between input shaft 9 and intermediate shaft 10, the steering torque based on the relative rotational angle, etc.

Effects of Fifth Embodiment

According to the fifth embodiment, electric motor 2 is the non-hollow motor, and is connected to input shaft 9 via the speed reducer and connection shaft 56.

Also the steering device including such electric motor 2 serves to increase motor assist torque Tm by supplemental torque Tx and stabilize steering by a driver even under the hydraulic abnormality, during both manual driving and automatic driving.

The invention claimed is:

1. A steering device comprising:
a steering shaft structured to receive rotation from a steering wheel;
a transmitting mechanism structured to transmit rotation from the steering shaft to a turning wheel;
a power cylinder that includes a piston disposed in the transmitting mechanism, and includes a pair of liquid chambers defined by the piston, and is structured to provide hydraulic assist torque for steering the turning wheel;
a rotary valve structured to supply hydraulic liquid to the pair of liquid chambers selectively depending on rotation of the steering shaft;
an electric motor structured to provide a motor assist torque for the steering shaft;
a torque sensor structured to measure a steering torque based on rotation of the steering shaft; and
a control unit configured to:
determine a hydraulic abnormality to be present in the pair of liquid chambers, in response to satisfaction of a condition that a total torque of the steering torque and the motor assist torque is greater than a predetermined threshold torque;

increase the motor assist torque of the electric motor in response to a determination that the hydraulic abnormality is present; and stop increasing the motor assist torque of the electric motor in response to satisfaction of a condition that an absolute value of the total torque is equal to or less than 5 Nm.

2. The steering device as claimed in claim 1, wherein:

the predetermined threshold torque is 8 Nm; and the control unit is configured to determine the hydraulic abnormality to be present, in response to satisfaction of a condition that: the total torque is greater than 8 Nm; and an absolute value of a steering speed of the steering shaft is less than 90 deg/s.

3. The steering device as claimed in claim 1, wherein the control unit is configured to perform the determination of the hydraulic abnormality during automatic driving.

4. A steering device comprising:

a steering shaft structured to receive rotation from a steering wheel;

a transmitting mechanism structured to transmit rotation from the steering shaft to a turning wheel;

a power cylinder that includes a piston disposed in the transmitting mechanism, and includes a pair of liquid chambers defined by the piston, and is structured to provide hydraulic assist torque for steering the turning wheel;

a rotary valve structured to supply hydraulic liquid to the pair of liquid chambers selectively depending on rotation of the steering shaft;

an electric motor structured to provide a motor assist torque for the steering shaft;

a torque sensor structured to measure a steering torque based on rotation of the steering shaft; and a control unit configured to:

determine a hydraulic abnormality to be present in the pair of liquid chambers, in response to satisfaction of a condition that a total torque of the steering torque and the motor assist torque is greater than a predetermined threshold torque;

increase the motor assist torque of the electric motor in response to a determination that the hydraulic abnormality is present; and after determining that the hydraulic abnormality is present, cancel the determination of the hydraulic abnormality to be present, in response to satisfaction of a condition that:

an engine speed is greater than 400 rpm;

a vehicle speed is greater than 20 km/h;

an absolute value of a steering angle is greater than 30 degrees;

an absolute value of the steering torque is less than 5 Nm; and the steering angle and the steering torque coincide with each other in signs of positive or negative.

5. The steering device as claimed in claim 4, wherein:

the predetermined threshold torque is 8 Nm; and the control unit is structured to determine the hydraulic abnormality to be present, in response to satisfaction of a condition that: the total torque is greater than 8 Nm; and an absolute value of a steering speed of the steering shaft is less than 90 deg/s.

6. The steering device as claimed in claim 4, wherein the control unit is configured to perform the determination of the hydraulic abnormality during automatic driving.

* * * * *